(12) United States Patent
Khanna

(10) Patent No.: US 8,495,009 B2
(45) Date of Patent: Jul. 23, 2013

(54) INCORPORATING TEMPORAL ASPECTS OF DATA IN A RELATIONAL STORAGE SYSTEM

(75) Inventor: Prateek Khanna, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 179 days.

(21) Appl. No.: 12/869,642

(22) Filed: Aug. 26, 2010

(65) Prior Publication Data

US 2012/0054149 A1 Mar. 1, 2012

(51) Int. Cl.
G06F 17/30 (2006.01)
(52) U.S. Cl.
USPC ........................................... 707/609
(58) Field of Classification Search
USPC ........................................... 707/725
See application file for complete search history.

(56) References Cited

U.S. PATENT DOCUMENTS

| | | | |
|---|---|---|---|
| 5,404,502 | A | 4/1995 | Warner et al. |
| 6,148,308 | A | 11/2000 | Neubauer et al. |
| 6,185,556 | B1 | 2/2001 | Snodgrass et al. |
| 6,442,543 | B1 | 8/2002 | Snodgrass et al. |
| 6,647,382 | B1 | 11/2003 | Sarcco |
| 7,158,991 | B2 | 1/2007 | Kekre et al. |
| 7,346,628 | B2 | 3/2008 | Porter |
| 2011/0320419 | A1* | 12/2011 | Johnston et al. ............. 707/703 |

OTHER PUBLICATIONS

A. Prasad Sistla and Ouri Wolfson, ("Temporal Triggers in Active Databases"), IEEE Transactions on Knowledge and Data Engineering, vol. 7, No. 3, Jun. 1995, pp. 471-486.*
Snodgrass Richard T. et al., "Temporal Data Management", A Time Center Technical Report, Jun. 1997. 12 pages.
Mata-Toledo Ramon et al., Proceedings of ASBBS, "Better Business Reporting With Temporal Data Management". Feb. 2008. vol. 15 No. 1. pp. 1-5.
McBrien Peter "Temporal Data Base System" Received on Mar. 4, 2010  www.doc.ic.ac.uk/~pjm/teaching/temporal_database_project.html pp. 1-2.
Time Consult, "What Are Temporal Databases?", retrieved from internet: http://www.timeconsult.com/TemporalData/TemporalDB.html, May 21, 2005. pp. 1-4.
Ding Guofang et al., "Temporal Data Type and Temporal Relation Operations", IEEE International Conference on Information Acquisition, IEEXplore Digital Library, May 30, 2006. 6 pages.

(Continued)

*Primary Examiner* — Rehana Perveen
*Assistant Examiner* — Alexander Khong
(74) *Attorney, Agent, or Firm* — Hickman Palermo Truong Becker Bingham Wong LLP

(57) ABSTRACT

A method, apparatus, and computer-readable medium are provided for storing data such that the data automatically changes to remain current over time. In one embodiment, a database server stores metadata in association with data that is stored in a database. The metadata specifies a time and a manner in which the data should change. On, near, or after the specified time, the database server reads the metadata to determine that the specified time is satisfied. In response to determining that the specified time has been satisfied, the database server changes the data stored in the database in the specified manner.

22 Claims, 3 Drawing Sheets

OTHER PUBLICATIONS

Bodlaender, M.P. et al, "A Transaction-based Temporal Data Model That Supports Prediction in Real-Time Databases" Proceedings 10th Euromicro Workshop on Real-Time Systems, IEEXplore Digital Library, Jun. 1998. 7 pages.

Bertino, E. et al, "An Approach to Model and Query Event-based Temporal Data" Fifth International Workshop on Temporal Representation and Reasoning., IEEXplore Digital Library, May 1998. 10 Pages.

Chau Vo Thingoc et al. "A temporal Compatible Object Relational Database System" Proceedings. IEEE SoutheastCon, IEEXplore Digital Library, Mar. 2007. 6 Pages.

Tansel A.U et al. "Temporal Relational Data Model" IEEXplore Digital Library, IEEE Transactions on Knowledge and Data Engineering Jun. 1997. 16 Pages.

Yong Tang et al. "A Unified Model of Temporal Knowledge and Temporal Data." The 8th International Conference on Computer Supported Cooperative Work in Design, 2004 IEEXplore Digital Library. Nov. 2004. 3 Pages.

Wan, Jing et al. "Research on Temporal Multi-valued Dependency Cover" ISISE '08. International Symposium on Information Science and Engieering IEEXplore Digital Library. Dec. 2008. 4 pages.

\* cited by examiner

INCORPORATING TEMPORAL ASPECTS OF DATA IN A RELATIONAL STORAGE SYSTEM

FIELD OF THE INVENTION

The present invention relates to managing data that automatically changes over time.

BACKGROUND

Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. One non-limiting database language supported by many database servers is SQL, including proprietary forms of SQL supported by such database servers as Oracle, (e.g. Oracle Database 10 g). SQL data definition language ("DDL") instructions are issued to a database server to create or configure database objects, such as tables, views, or complex data types.

Information in the World

Some information in the world logically changes over time. Other information stays the same basically at all times. For example, a person's birth date does not change once the person is born, but the person's age changes every year. As another example, an interest rate may or may not change, but an amount of accrued interest changes periodically. Some information predictably changes. In the examples, the person's age increases every year, either based on a previous age or based on a birth date, and the accrued interest changes periodically (for example, monthly) based on an interest rate, which may be fixed or variable, and a previous amount of accrued interest. Other information changes non-predictably, such as the person's weight, or a stock price for a corporation. Information that changes predictably may include any information that changes at a predictable time and in a predictable manner.

Information that changes non-predictably may be determined when the information is requested, for example, by re-measuring the information or by retrieving latest measured information. Using the example above, a current weight may be determined by selecting the latest weight from a set of recorded weights. Similarly, a current stock price may be determined from a set of recorded trades.

Information that changes predictably may be determined when the information is requested based on other known information, such as a baseline value. Using the examples above, an application may determine a person's age by subtracting the birth date from the current date. In one example, a remainder in terms of days may be disregarded. In a specific example, the age of a person born on Feb. 1, 1980, may be determined by subtracting Feb. 1, 1980 from a current date in 2010. If the current day is before February 1, then the person is 29 years old. If the current day is on or after February 1, then the person is 30 years old. Whenever a person's age is requested, the application may compute the person's age based on the birth date and the current date. Similarly, when an amount of accrued interest is requested, the application may determine an amount of accrued interest by multiplying a borrowed amount by an interest rate.

Databases store static data values such as a person's name and birth date. Whenever a database application uses a person's age, the person's age may be computed using a birth date retrieved from the database via a database server. Some databases store time-stamped snapshots of data that has previously changed, but even these databases cannot assure that stored data remains current with respect to the information. For example, a stored age may be stale if it was computed before a person's birthday. Similarly, a stored amount of accrued interest may be stale if it was computed before the end of the month. More efficient and reliable techniques are provided herein for managing data that changes over time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
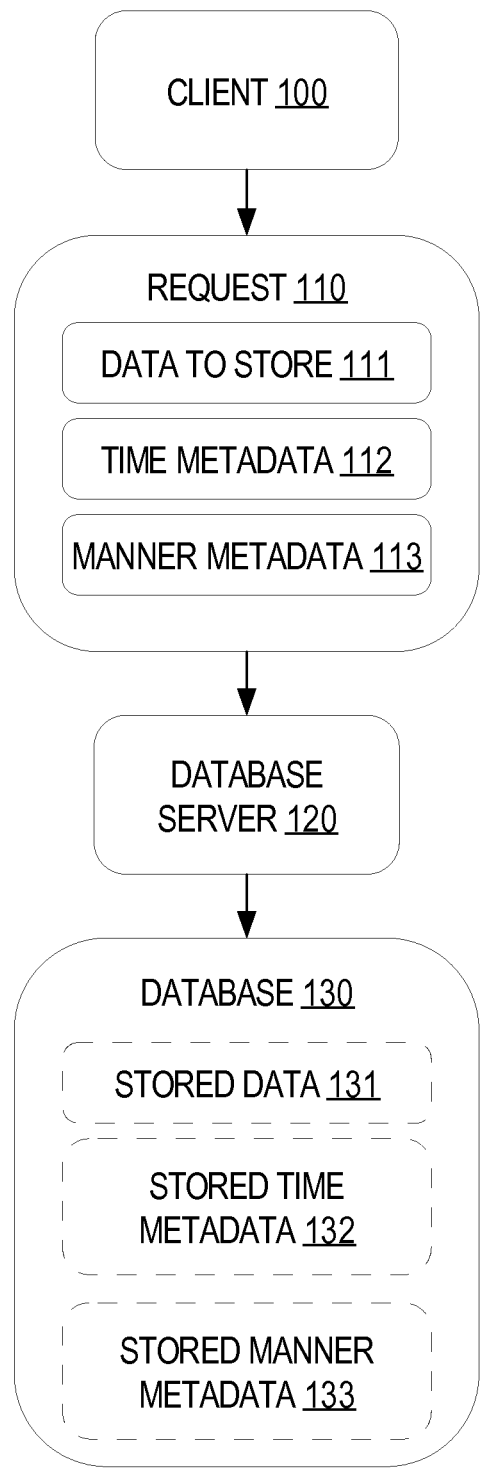
FIG. 1 is a block diagram showing an example system for receiving time and manner metadata with a request to store data.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for storing data such that the data automatically changes to remain current over time. The techniques described herein may be implemented in hardware, software, or a combination of hardware and software, as methods, systems, devices, and computer-readable mediums storing instructions that are executable on devices. In one embodiment, a database server stores metadata in association with data that is stored in a database. The metadata specifies a time and a manner in which the data should change. On, near, or after the specified time, the database server reads the metadata to determine that the specified time is satisfied. In response to determining that the specified time has been satisfied, the database server changes the data stored in the database in the specified manner.

In one embodiment, the database server receives the metadata with a request to store the data in the database. For example, the request may be a database command to store a particular value in the database, and the metadata may be provided via a marked up syntax that is part of the database command. In another example, the metadata is provided with the database command, but not as part of the database command. In yet another example, the metadata may be stored in a table that stores specified times and specified manners for changing data within the database. The metadata in the table may be provided or modified independently of when (e.g., before, after, or at the same time as) the data to change is provided or modified. The table may store multiple times and multiple manners for changing data within the database.

In various embodiments, the metadata indicates that the data is to change in the specified manner at an absolute time or at a relative time. For example, the time may be specified as a timestamp of an absolute time in terms of years, months, days, hours, minutes, seconds, and/or some other timing value that identifies a particular time. As another example, the time may be specified as a time that is relative to some other time, such as when the request was formulated, sent, received, or executed.

In one embodiment, the metadata includes a database command for changing the data value. For example, the metadata may indicate that data is to be deleted from the database, added to the database, or modified by addition, subtraction, or some other function. The data may be modified based on other data that is external to the database, based on other data within the database, and/or based on the function and values provided in the metadata.

In a particular embodiment, the metadata includes an identifier that identifies the data to be changed at the specified time in the specified manner. The identifier may uniquely identify a single value, or may refer to multiple values that should be changed. For example, the identifier may include one or more key-value pairs that identify a single value or a set of values.

In one embodiment, the database server checks stored metadata periodically to determine whether any of the specified times are satisfied. In another embodiment, the database server selects the times to check the stored metadata based on the stored specified times, or based on load conditions of the database system. The specified times are stored in association with the specified manner such that, when the database server determines that any of the specified times are satisfied, the database server executes commands to change data in the database in the associated specified manner.

Receiving and Storing Metadata

In one embodiment, a database server receives a request to store the data in the database on behalf of a database client. The request may be sent directly from the client, or the request may be routed through one or more nodes between the client and the database server. In a specific example, the request is a database command to store a value in the database such as "INSERT INTO CONTRACTOR(NAME,AGE) VALUES ('JAMES',31)", which inserts an entry for a contractor named "JAMES" of age 31 into the CONTRACTOR table. In one embodiment, metadata may be provided with the request to store data. In a specific example, the metadata is provided as part of the database command with a hint-like syntax, where the start of the metadata marked with "/*" and the end of the metadata marked with "*/". Inside the markings, metadata instructions are provided to specify a time and a manner in which data is to change in the database. In the specific example above, the request may include: "INSERT INTO CONTRACTOR(NAME,AGE) VALUES('JAMES',31)/ *VALIDTILL(31/12/2009)*/", indicating that the data to be stored is valid only until Dec. 31, 2009.

In one embodiment, the query processor is configured to extract the temporal metadata from the query and populate a table that stores the temporal metadata in the database. In a specific example, a schema-wide temporal metadata table is maintained, which contains temporal metadata corresponding to all of the tables within the schema. An example temporal metadata table, ScheduledTasks, includes the following columns: TIMESTAMP, TABLE, DISCRIMINATOR, QUERY, and PERIODICITY.

In another embodiment, the temporal metadata may be otherwise stored in association with the data to be changed. For example, the temporal metadata may be stored in a hidden column of a temporal data type within the same table in which the data is stored. The data of the hidden column may be accessed in a same manner that the data of the temporal metadata table would have been accessed. In another example, the data may be stored as a temporal datatype that includes the temporal information within the data itself.

In an example for storing the metadata in a metadata table, the metadata, "VALIDTILL(31/12/2009)," from the request may be stored by the database server as the entry below in a ScheduledTasks table.

```
TIMESTAMP => 31/12/2009 00:00:01 GMT
TABLE => CONTRACTOR
DISCRIMINATOR => NAME='JAMES' AND AGE=31
QUERY => DELETE FROM CONTRACTOR
WHERE NAME='JAMES' AND
AGE=31
PERIODICITY=>1
```

The timestamp column stores the time that is specified by the request. In the example shown, default timing values at various levels of granularity are added when they are not included with the request. Here, the value "00:00:01" is appended to the date to indicate that the query should be triggered at the beginning of the day. Other granularities and formats of timing values can be used as well. For example, the current year may be added to the specified time when no year is specified in the request.

The table column stores the table to be modified in the manner specified by the request. The discriminator column provides key-value pairs for identifying the data to be modified in the manner specified by the request. Here, all rows with a NAME of "JAMES" and an AGE of 31 will be modified in the manner specified. The discriminator may or may not uniquely identify a single row in the database. The key-value pairs define a primary key for the data if they uniquely identify a single row of data to be modified. In one embodiment, the database server disallows discriminators that are not primary keys. In another embodiment, the database server sends a warning message to a client when a later command causes a once primary key to refer to more than one row. For example, if another contractor named "JAMES" of age 31 is created, then the client who submitted the command to automatically remove contractors named "JAMES" of age 31 is warned. In another example, the client who added the second contractor named "JAMES" of age 31 is warned.

In the example entry in the ScheduledTasks table, the identified data is to be modified by invalidating an entry in the contractor table. Hence, the example manner in which the data is to be modified is "DELETE," or by deletion of the data. As shown, the hint "VALIDTILL( )" causes a "DELETE" query to be executed at the specified time. In the example, the "DELETE" query operates on the table specified in the database command, with the other discriminators of the database command added in a WHERE clause.

The example periodicity column specifies that the command is to be executed only a single time, which may be the default periodicity for a DELETE type of action. In one embodiment, the periodicity is specified along with the metadata. For example, the periodicity may be specified with the metadata by the following database command: "INSERT INTO EMPLOYEE(NAME,AGE) VALUES('JAMES',31)/ *INCREMENT(AGE,27/03,1)*/". The example command stores an entry for an employee named "JAMES" of age 31 into the EMPLOYEE table, and stores temporal metadata to cause the AGE of the employee named "JAMES" to be automatically incremented every year on March 27.

Another example ("INSERT INTO TASK(NAME,DAYS_TO_DEADLINE) VALUES('Task1', 10)/*DECREMENT (DAYS_TO_DEADLINE,*23:59; 59, 1)*/") shows a command that causes the database server to automatically decrement a value every day by one. During execution of this command, the database server may create an entry in the ScheduledTasks table as follows:

```
TIMESTAMP => 30/07/2009 23:59:59 GMT
TABLE => TASK
DISCRIMINATOR => NAME='TASK1'
QUERY => UPDATE TASK SET DAYS_TO_DEADLINE =
#DAYS_TO_DEADLINE - 1 WHERE NAME='TASK1'
PERIODICITY => *
```

Once the database server executes the task on July 30, the database server may update the entry to:

```
TIMESTAMP => 31/07/2009 23:59:59 GMT
TABLE => TASK
DISCRIMINATOR => NAME='TASK1'
QUERY => UPDATE TASK SET DAYS_TO_DEADLINE =
#DAYS_TO_DEADLINE - 1 WHERE NAME='TASK1'
PERIODICITY => *
```

The entries in the ScheduledTasks table may specify any manner for modifying data in the database, and the metadata described herein is not limited to the example queries or other example manners for modifying data in the database. In another example, the metadata specifies an INSERT operation to be performed on the data. For example, the metadata may specify that certain data from one table should be inserted into another table on a specified date. In a specific example, data in an organization's database may include trainee data stored in a trainee table and employee data stored in an employee table. Metadata stored in the database specifies that, at a specified date and time upon which training is complete, trainees from the trainee table are to be inserted as employees into the employee table. On or after the specified data and time, the database server reads the metadata and inserts the trainees as employees into the employees table. Optionally, the metadata may also specify that the trainees inserted into the employees table are deleted from the trainees table.

The techniques described herein may be utilized without receiving the metadata as part of the database command. For example, the request may include the database command, "INSERT INTO CONTRACTOR(NAME,AGE) VALUES ('JAMES',31)", as one parameter of the request and the metadata, "VALIDTILL(31/12/2009)", as another parameter of the request. The temporal metadata parameter may be provided without additional discriminators, or with additional or different discriminators than those provided in the database command. In other words, the metadata may provide information for modifying the same data that is modified by the command, a subset of the data modified by the command, other data stored in the database, or for creating or inserting new data to be stored in the database.

The metadata may be stored in a table that stores specified times and associated manners for changing data within the database. The metadata in the table may be provided or modified independently of when (e.g., before, after, or at the same time as) the data to change is provided or modified. The table may store multiple times and multiple manners for changing data within the database. In one example, the database server receives a request to store temporal metadata in the table. The request specifies the time and manner in which data in the database is to change, but the command itself does not modify that data.

FIG. 1 shows an example system for receiving time and manner metadata with a request to store data. As shown, client 100 sends a request 110 to database server 120. Request 110 includes data to store 111, time metadata 112, and manner metadata 113. In one embodiment, metadata 112 and 113 and the data to store 111 are identified in a database command in request 110. In another embodiment, metadata 112 and 113 are provided as separate parameters of request 110. In response to receiving the request, database server 120 stores stored data 131, stored time metadata 132, and stored manner metadata 133 in database 130. Stored time metadata 132 may be derived from time metadata 112, but is not necessarily the same as time metadata 112. In one example, database server 120 may change the formatting of time metadata 112 and add default values to create stored time metadata 132. Similarly, stored manner metadata 133 may be derived from manner metadata 113, but is not necessarily the same as manner metadata 113. In one example, database server 120 may map a function named in manner metadata 113 to one or more database commands provided in stored manner metadata 133.

Time Metadata

Time metadata received and stored by the database server may include any indication as to the time for making a change to data in the database. In one embodiment, the time may be specified by a timestamp in a request to store the data to be changed. The time may be specified in any units or granularities, absolutely or relatively. For example, the time may be specified in terms of years, months, days, hours, minutes, seconds, or milliseconds. A time zone may be provided with the specified time.

In one embodiment, the time is specified relative to a time that is known to or determined by the database server. For example, the time may be specified as one year after the request was formulated, sent, received, or executed. An expression such as "VALIDFOR(2 years)" may be used to indicate that the data expires in two years.

In another embodiment, the time is specified in terms of an absolute time, optionally combined with default times. For example, the time may be specified as a timestamp in terms of months, days, and years. Optionally, a default number of hours, minutes, and seconds, such as 00:00:01, are attributed to a time that does not specify to the granularity of hours, minutes, and seconds.

The time metadata may be converted and reformatted from the form specified in the request. For example, the time metadata may be converted from one time zone to another time zone, reformatted to a standard format used by the database server, and/or modified by adding default values to the time specified in the request. In the example where the time is specified in the expression "VALIDTILL(31/12/2009)," the time value may be stored in the database as "31/12/2009 00:00:01 GMT," or some other value that represents, to the database server, the time specified in the request. In one embodiment, the database server stores time metadata in a temporal metadata table in the database.

Manner Metadata

Manner metadata received and stored by the database server may include any indication as to the manner for making a change to data in the database. For example, the specified manner may indicate a specific operation, method, procedure, function, or command for the database server to execute with respect to data in the database. The manner may be specified in the request using an expression that is associated with one or more database commands that, when executed, add, delete, or otherwise modify data in the database.

In one embodiment, the manner metadata specified in the request is associated with a database command for modifying data in the database. In response to receiving the request, the database server stores the metadata specified by the request. In another embodiment, the database server stores some other indication that identifies the database command for modifying the data in the database. In a particular embodiment, the database server stores the database command in a temporal metadata table. When stored or when retrieved by the database server, the database command may be combined with discriminator information that was specified in the request. The discriminator information identifies values to be modified. For example, the command may be combined with an identifier of a table to be modified and a key-value pair that identifies one or more values within the table. In order to speed up automatic retrieval and execution of the command at the specified time, the command may be stored in a form that is executable by the database server without further modification.

The techniques described herein are not limited to any specific manners for modifying data in the database. In various examples, the metadata may indicate that data is to be deleted from the database, added to the database, or modified by addition, subtraction, multiplication, division, or some other function. In specific examples, the metadata may specify that the data is to be incremented or decremented periodically. In another example, the metadata may specify that the data is to be doubled on specified dates or periodically for a specified number of times.

The data may be modified based on other data that is external to the database, such as data fetched from another server. In a specific example, the stored data may be replaced or otherwise modified based on stock ticker data from an external server. In another example, the stored data may be modified based on other stored data in the database. For example, a first profit value may be periodically modified by a cost value that is stored in the database, resulting in a second profit value.

In one embodiment, a value in the database is created based on the temporal metadata. For example, a profit record may be created daily and added to a profit table. In another example, a scheduled task may be created based on another scheduled task, resulting in recursively created scheduled tasks. In this example, the table to be modified is the ScheduledTasks table, and the manner of modifying the table is by creating a new item in the table. In one embodiment, upon execution, a first scheduled task may cause one or more other scheduled tasks to be created. The one or more other scheduled tasks may, at some other specified time, create one or more records in the database. In a specific example, the first task is scheduled at the end of the quarter, and the second task is scheduled for a week after the end of the quarter, or based on expected load conditions of the database server.

Identifying Values to be Changed

Once the metadata is received by the database server, the values to be changed may be identified based on discriminator information received with the metadata, with the command, or received separately. In a particular embodiment, the metadata in the request includes an identifier that identifies the data to be changed at the specified time in the specified manner. In one example, key-value pairs are received with the time metadata and the manner metadata. The key-value pairs may uniquely identify a single value or generally identify multiple values in the database.

In another embodiment, the values are identified based on an expression provided with the request or as another parameter to the request. The expression may be used by the database server to refer to the data values to be modified, or the expression may be converted and stored as another expression that identifies, to the database server, the data values to be modified.

In one embodiment, after the temporal metadata is stored, values may be removed or added from a set of values to be modified. In one example, a key-value pair identifies only a single value when the key-value pair is stored as a discriminator in the temporal metadata table. Then, after the metadata is stored, another value is added to the database that also satisfies the key-value pair. At a later time, the temporal metadata is used to automatically modify the data, which includes both the single value and the other value.

Using the Metadata to Automatically Change Values

A thread running on the database server, or any process managing the database, checks the stored temporal metadata to determine whether any of the specified times are satisfied. The metadata may be checked periodically, at pre-determined times such as times specified by a database administrator, at times during which a load on the database server is predicted to be low, or at times based on when the next scheduled item of temporal metadata is to be triggered. In one example, the thread runs daily just after midnight to determine whether any items of temporal metadata are satisfied.

In another example, the thread runs based on the specified time for the next scheduled item of temporal metadata. In one example, the temporal metadata is sorted, either physically on disk or logically by virtue of an index, based on when the items of temporal metadata are to be triggered. For example, the item with the earliest time appears first in the list, and the item with the latest time appears last in the list. In this example, a quick check of the next item in the list may be made to determine when the next task is scheduled. In one embodiment, the thread runs at or just after the next task is scheduled. In one example, the thread is limited to a pre-determined maximum number of checks per day, per hour, or per minute. In another embodiment, the thread is prevented from running during peak load times of the database server, or when the current load exceeds a threshold.

The specified times are stored in association with the specified manner such that, when the database server determines that any of the specified times are satisfied, the database server executes commands to change data in the database in the associated specified manner. For example, a thread running on Jan. 1, 2010 may determine that a first item (Dec. 30, 2009) and second item (Jan. 1, 2010) of time metadata are satisfied, but a third item (Jan. 3, 2010) and fourth item (Feb. 1, 2010) of time metadata are not satisfied. In response the manner metadata associated with the first and second items are used to execute commands to change data in the database. The manner metadata associated with the third and fourth items are not used. In one embodiment, a task is deleted from the ScheduledTasks table once the task has been executed.

Figure 2:
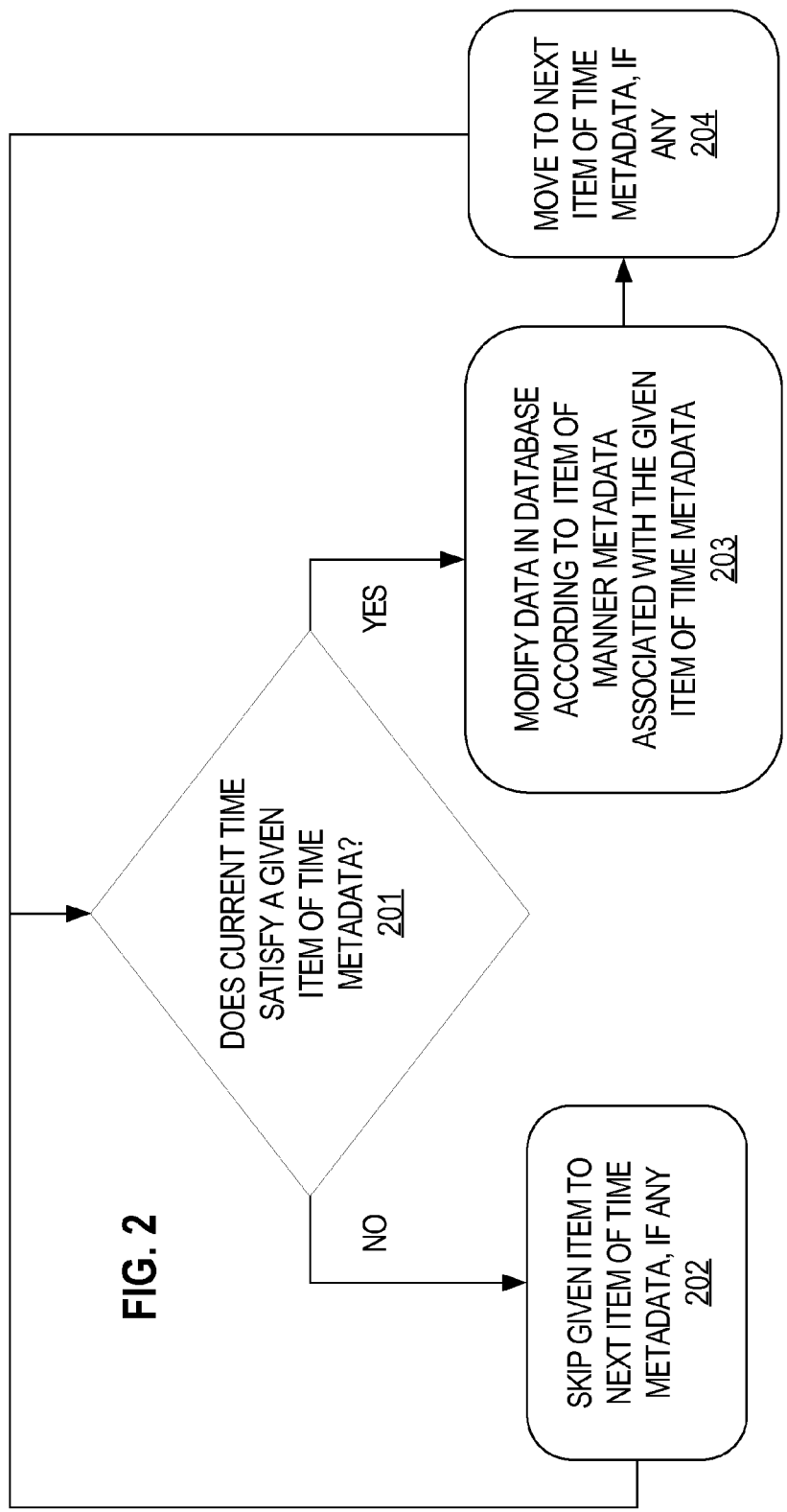
FIG. 2 is a flow chart showing an example process for modifying data according to manner metadata in response to determining that the current time satisfies associated time metadata.

FIG. 2 shows a decision diagram for determining whether or not to modify data in the database according to an item of manner data. In one example, a scheduler wakes up periodically or at a scheduled time to start performance of the process described in FIG. 2. In step 201, a determination is made as to whether the current time satisfies a given time from the ScheduledTasks table. For example, a task scheduled for 00:00:01 on Dec. 31, 2009, may be triggered if the current time is on or after 00:00:01 of Dec. 31, 2009. In another example, the task may be triggered only if the current time matches the specified time. In yet another example, the task may be triggered if the current time is within a threshold distance of the specified time, optionally regardless of whether it is before or after the specified time. If the current time satisfies the specified time, then, in step 203, data in the database is modified according to an item of manner metadata associated with the given, satisfied, item of time metadata. The scheduler may then move on to the next item of time metadata, if any, to re-perform step 201 if needed.

If the current time does not satisfy the specified time for a given item of time metadata, then, in step 202, the given item of time metadata is skipped. The scheduler may then move on to the next item of time metadata, if any, to re-perform step 201 if needed.

Error and Recovery

In one embodiment, the database server logs the automatic operations that are performed based on the temporal metadata. In the event that an automatic operation is performed in error or modifies the wrong data, the logs may be used to roll back the changes that were performed.

If a command triggered by the temporal metadata fails to execute successfully, then the database server may retry the command a pre-determined number of times. If the command fails to execute after the pre-determined number of times, then the command associated with the item of temporal metadata may be re-tried again at the next scheduled time. In one embodiment, an item of temporal metadata is deleted if a command associated with the item fails a threshold number of times to execute successfully.

In one embodiment, a database administrator is notified when a command fails to execute successfully or when a temporal metadata item is removed from the metadata table. Contact information for the database administrator may be stored in association with the metadata table. In another embodiment, a user who last created or modified the item of temporal metadata is notified. Contact information for the user may be provided with the request to store or modify the metadata, and the contact information for the user may be stored in association with the particular item of metadata.

In one embodiment, items of temporal metadata that have been satisfied, and for which the associated commands have successfully been executed, are removed from the metadata table. Optionally, the database server may store these deleted items for a pre-determined period of time. The deleted items may be restored with a new timestamp, or they may be used to roll back changes already made to data in the database.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
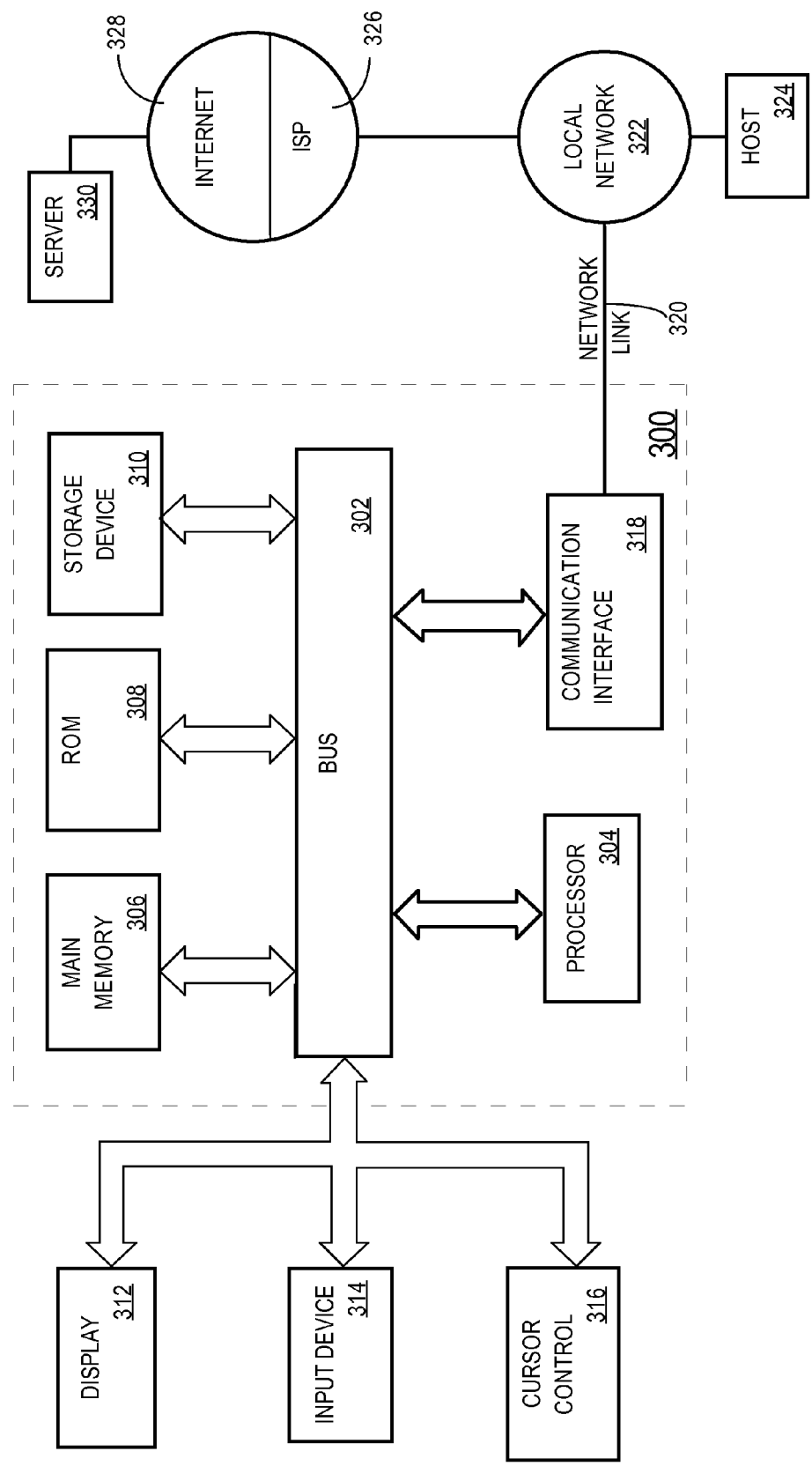
FIG. 3 is a block diagram that illustrates a computer system upon which an embodiment described herein may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving a request to store a value in a record of a database, wherein the request comprises a single expression that includes a database command and temporal metadata, wherein the database command causes the value to be stored and comprises discriminator information that identifies stored data comprising the value, and wherein the temporal metadata is marked according to a syntax that separates the temporal metadata from the database command, wherein the temporal metadata specifies a time and a manner in which the value should change;
    in response to receiving the request, executing the single expression at least in part by:
        executing the database command to store the value in the record of the database, and
        storing, based at least in part on the temporal metadata and the discriminator information, first information that indicates the specified time and second information that indicates the specified manner and that identifies the stored data;
    after an amount of time has passed:
        based on the first information that indicates the specified time, determining whether a current time satisfies the specified time;
        in response to determining that the current time satisfies the specified time, changing the value stored in the record of the database in the specified manner based on the second information that indicates the specified manner and that identifies the stored data;

wherein the method is performed by one or more computing devices.

2. The method of claim 1, wherein the second information that indicates the specified manner and that identifies the stored data is a second command which, when executed, changes the value in the specified manner.

3. The method of claim 1, wherein the specified manner in which the value should change comprises deletion, and wherein changing the value in the specified manner comprises deleting the value.

4. The method of claim 1, wherein the specified manner in which the value should change comprises one or more of addition or subtraction, and wherein changing the value in the specified manner comprises either adding to or subtracting from the value.

5. The method of claim 1, wherein the specified manner in which the value should change comprises a specified function, and wherein changing the value in the specified manner comprises performing the specified function on the value.

6. The method of claim 1, wherein the value is a first value, and wherein the specified manner in which the first value should change is based on a second value that is external to the database.

7. The method of claim 1, wherein the value is a first value, and wherein the specified manner in which the first value should change is also based on a second value specified in the expression.

8. The method of claim 1, wherein the request is a first request, and wherein the first information is stored in a table in association with the second information, further comprising:

receiving a second request to store third information in the table in association with fourth information;

wherein the third information indicates another time and the fourth information indicates another manner in which another value stored in the database should change, and wherein the fourth information also identifies other stored data comprising the other value; and based on the third information that indicates the other time, determining whether the current time satisfies the other time;

in response to determining that the current time satisfies the other time, changing the other value stored in the database in the other manner based on the fourth information that indicates the other manner and that identifies the other stored data.

9. The method of claim 1, wherein the request is a first request, and wherein the first information is stored in a table in association with the second information, further comprising:

receiving a second request to store third information in the table in association with fourth information;

wherein the third information indicates another time and the fourth information indicates that another value should be created, and wherein the fourth information also identifies other stored data comprising the other value; and based on the third information that indicates the other time, determining whether the current time satisfies the other time;

in response to determining that the current time satisfies the other time, creating the other value in a record of the database based on the fourth information that indicates the other value should be created and that identifies the other stored data.

10. One or more non-transitory storage media storing instructions which, when executed by one or more computing devices, cause performance of:

receiving a request to store a value in a record of a database, wherein the request comprises a single expression that includes a database command and temporal metadata, wherein the database command causes the value to be stored and includes discriminator information that identifies stored data comprising the value, and wherein the temporal metadata is marked according to a syntax that separates the temporal metadata from the database command, wherein the temporal metadata specifies a time and a manner in which the value should change;

in response to receiving the request, executing the single expression by:

executing the database command to store the value in the record of the database, and storing, based at least in part on the temporal metadata and the discriminator information, first information that indicates the specified time and second information that indicates the specified manner and that identifies the stored data;

after an amount of time has passed:

based on the first information that indicates the specified time, determining whether a current time satisfies the specified time;

in response to determining that the current time satisfies the specified time, changing the value stored in the record of the database in the specified manner based on the second information that indicates the specified manner and that identifies the stored data.

11. One or more non-transitory storage media as recited in claim 10, wherein the second information that indicates the specified manner and that identifies the stored data is a second command which, when executed, changes the value in the specified manner.

12. One or more non-transitory storage media as recited in claim 10, wherein the specified manner in which the value should change comprises deletion, and wherein changing the value in the specified manner comprises deleting the value.

13. One or more non-transitory storage media as recited in claim 10, wherein the specified manner in which the value should change comprises one or more of addition or subtraction, and wherein changing the value in the specified manner comprises either adding to or subtracting from the value.

14. One or more non-transitory storage media as recited in claim 10, wherein the specified manner in which the value should change comprises a specified function, and wherein changing the value in the specified manner comprises performing the specified function on the value.

15. One or more non-transitory storage media as recited in claim 10, wherein the value is a first value, and wherein the specified manner in which the first value should change is based on a second value that is external to the database.

16. One or more non-transitory storage media as recited in claim 10, wherein the value is a first value, and wherein the specified manner in which the first value should change is also based on a second value specified in the expression.

17. One or more non-transitory storage media as recited in claim 10, wherein the request is a first request, and wherein the first information is stored in a table in association with the second information, wherein the instructions, when executed by the one or more computing devices, further cause performance of:

receiving a second request to store third information in the table in association with fourth information;

wherein the third information indicates another time and the fourth information indicates another manner in which another value stored in the database should change, and wherein the fourth information also identifies other stored data comprising the other value; and based on the third information that indicates the other time, determining whether the current time satisfies the other time;

in response to determining that the current time satisfies the other time changing the other value stored in the database in the other manner based on the fourth information that indicates the other manner and that identifies the other stored data.

18. One or more non-transitory storage media as recited in claim 10, wherein the request is a first request, and wherein the first information is stored in a table in association with the second information, wherein the instructions, when executed by the one or more computing devices, further cause performance of:

receiving a second request to store third information in the table in association with fourth information;

wherein the third information indicates another time and the fourth information indicates that another value should be created, wherein the fourth information also identifies other stored data comprising the other value; and based on the third information that indicates the other time, determining whether the current time satisfies the other time;

in response to determining that the current time satisfies the other time, creating the other value in a record of the database based on the fourth information that indicates the other value should be created and that identifies the other stored data.

19. The method of claim 2, wherein the second command causes a different operation than the database command included in the expression; wherein the method further comprises adding at least part of the discriminator information to a WHERE clause of the second command.

20. The method of claim 1, wherein the temporal metadata does not include any of the discriminator information.

21. One or more non-transitory storage media as recited in claim 11, wherein the second command causes a different operation than the database command included in the expression; wherein the instructions, when executed, further cause performance of adding at least part of the discriminator information to a WHERE clause of the second command.

22. One or more non-transitory storage media as recited in claim 10, wherein the temporal metadata does not include any of the discriminator information.

* * * * *

UNITED STATES PATENT AND TRADEMARK OFFICE
CERTIFICATE OF CORRECTION

PATENT NO. : 8,495,009 B2  
APPLICATION NO. : 12/869642  
DATED : July 23, 2013  
INVENTOR(S) : Khanna Page 1 of 1

It is certified that error appears in the above-identified patent and that said Letters Patent is hereby corrected as shown below:

On the Title page 2, column 2, under other publications, line 10, delete "Engieering" and insert -- Engineering --, therefor.

In the Claims

In column 15, line 10, in Claim 17, delete "time" and insert -- time, --, therefor.

Signed and Sealed this  
Twelfth Day of November, 2013

Teresa Stanek Rea  
*Deputy Director of the United States Patent and Trademark Office*